(12) United States Patent
Schechner et al.

(10) Patent No.: US 12,480,687 B2
(45) Date of Patent: Nov. 25, 2025

(54) INSTALLATION DEVICE HAVING POWER-ENGINEERING OR BUILDING-SERVICES MODULES, AND METHOD FOR REMOVING A MODULE FROM AN INSTALLATION DEVICE OF THIS TYPE

(71) Applicant: Envola GmbH, Ulm (DE)

(72) Inventors: Alexander Schechner, Ulm (DE); Gerhard Ihle, Ulm (DE)

(73) Assignee: Envola GmbH, Ulm (DE)

( * ) Notice: Subject to any disclaimer, the term of this patent is extended or adjusted under 35 U.S.C. 154(b) by 429 days.

(21) Appl. No.: 18/028,239

(22) PCT Filed: Sep. 24, 2021

(86) PCT No.: PCT/EP2021/076328
§ 371 (c)(1),
(2) Date: Mar. 24, 2023

(87) PCT Pub. No.: WO2022/063969
PCT Pub. Date: Mar. 31, 2022

(65) Prior Publication Data
US 2023/0373765 A1 Nov. 23, 2023

(30) Foreign Application Priority Data

Sep. 25, 2020 (DE) ...................... 10 2020 125 017.7

(51) Int. Cl.
*F24H 9/14* (2006.01)
(52) U.S. Cl.
CPC .................................... *F24H 9/148* (2013.01)
(58) Field of Classification Search
CPC . F24H 9/148; F24H 9/02; F24D 11/02; F24D 19/00; F24F 13/32
See application file for complete search history.

(56) References Cited

U.S. PATENT DOCUMENTS

2009/0321041 A1* 12/2009 Hammond .............. F24D 15/04
165/104.34
2022/0357111 A1* 11/2022 Schechner .......... F28D 20/0052

FOREIGN PATENT DOCUMENTS

| CH | 715015 A2 * | 11/2019 | ................ F16M 1/00 |
| CZ | 2018301 A3 * | 8/2019 | .............. F25B 30/06 |

(Continued)

OTHER PUBLICATIONS

International Search Report in PCT/EP2021/076328, mailed Jan. 4, 2022.

Primary Examiner — Bayan Salone
(74) Attorney, Agent, or Firm — Collard & Roe, P.C.

(57) ABSTRACT

An installation device having power-engineering or building-services-engineering modules, and a method therefor, includes at least two side walls and a removable front cover, which enclose stackable modules. The side walls have a frame, two longitudinal rails arranged therein, and a transverse rail. The longitudinal rails are arranged along the corners of the modules remaining in the device for servicing of a module, in order to secure the one or more modules arranged above the module to be serviced. The two frames are arranged along two longitudinal rails on the front side and can be connected, via pulleys attached to the upper frame segment, to the transverse rails, on which the module to be serviced rests, so that the module is removable from the installation device once the one or more modules arranged above the module to be serviced are secured to the longitudinal rails.

10 Claims, 4 Drawing Sheets

(56) References Cited

FOREIGN PATENT DOCUMENTS

Figure 1:
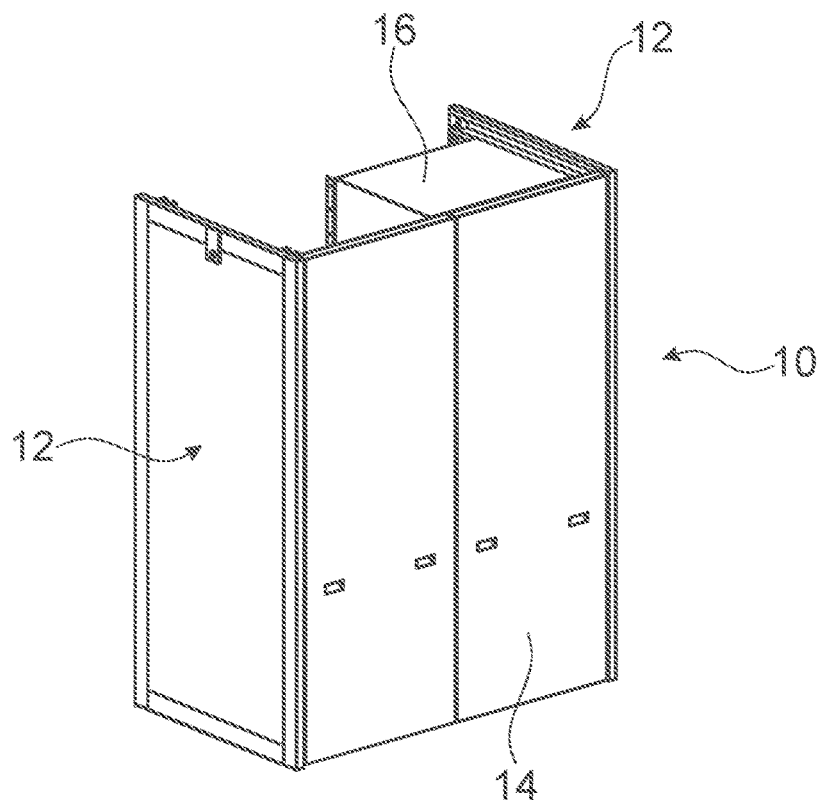

| DE | 102019118223 A1 | * | 1/2021 | ......... F28D 20/0043 |
| DE | 102020125017 A1 | * | 3/2022 | ............. F24H 9/148 |
| GB | 2359873 A | * | 9/2001 | ............. F24H 9/148 |

* cited by examiner

INSTALLATION DEVICE HAVING POWER-ENGINEERING OR BUILDING-SERVICES MODULES, AND METHOD FOR REMOVING A MODULE FROM AN INSTALLATION DEVICE OF THIS TYPE

CROSS REFERENCE TO RELATED APPLICATIONS

This application is the National Stage of PCT/EP2021/076328 filed on Sep. 24, 2021, which claims priority under 35 U.S.C. § 119 of German Application No. 10 2020 125 017.7 filed on Sep. 25, 2020, the disclosure of which is incorporated by reference. The international application under PCT article 21(2) was not published in English.

The present invention relates to an installation device with power-engineering or building-services-engineering modules, and method for removing a module from an installation device of this type.

The use of fossil energy carriers is not only increasingly uneconomical but is also increasingly being challenged due to the associated negative effects on the climate. In addition to increasing the use of renewable energy sources, efficient systems for energy storage are increasingly also required, which can ensure reduced energy consumption in combination with intelligent controls, for example during heating of buildings or during cooling of plants. Due to such measures, a high saving potential can be created irrespective of the energy carrier used, which also reduces the associated installation costs.

An example of an efficient system for energy storage is described in the previously unpublished patent application DE 10 2019 118 223 from the same applicant. There, a device for energy transmission and for energy storage in a liquid reservoir is described, which comprises a water heat exchanger arranged on a base and an air heat exchanger arranged above the water heat exchanger, wherein the water heat exchanger is arranged in a liquid reservoir surrounded by an inner shell which delimits the device with respect to an outer shell covering the inner shell from the base, wherein the outer shell is at least partially introduced into a ground layer, and the device is closed upward by a cover in such a way that an air flow from an air inlet to an air outlet through the air heat exchanger can be generated.

Typically, the active regions of the water heat exchanger and of the air heat exchanger are connected via a hydraulic unit to a heat pump which is mounted, for example, in the interior of a building. It is also possible here to attach such a device to a roof of a building, for example.

It is known from the general prior art to arrange power-engineering or buildings-services-engineering modules in installation cabinets, for example in the 19-inch format or as separate building blocks. However, such installations are either very complex or very incomprehensible and offer only little protection against ambient influences. Since such modules, for example the heat pump mentioned above, are frequently very heavy, a fitter is only able to carry out maintenance or replacement with greater effort.

Proceeding from this prior art, the inventors have now tasked themselves with solving the problem of providing an installation device and a method with which modules are particularly easy to install and service.

This problem is solved by the features of claim 1. Further advantageous embodiments of the invention are the subject matter of each of the dependent claims. These can be combined with one another in a technically meaningful manner. The description, in particular in conjunction with the drawing, additionally characterizes and specifies the invention.

According to the invention, an installation device comprising power-engineering or building-services-engineering modules is created, which comprises two side walls and a removable front cover which enclose a plurality of stackable modules, wherein the side walls have a frame, two longitudinal rails arranged therein, and a transverse rail, wherein the longitudinal rails are arranged along the corners of the modules remaining in the device for servicing or for removal of a module, in order to secure the one or more modules arranged above the module to be serviced, wherein the two frames are arranged along two longitudinal rails on the front side and can be connected, via pulleys attached to the upper frame segments, to the transverse rails, on which the module to be removed rests, so that said module is removable from the installation device once the one or more modules arranged above the module to be serviced is/are secured to the longitudinal rails.

Accordingly, in the installation device according to the invention, the modules are arranged behind two side walls and a removable front cover, so that they are protected from ambient influences at least from these sides. Since the modules are stacked one above the other, no complicated holding devices which would take over the installation of a module, for example as in installation cabinets, are necessary. However, the two side walls assume a further function during maintenance or replacement of a module. After the front cover has been removed, the side walls can be dismantled, wherein each of the side walls has a frame, two longitudinal rails arranged therein and a transverse rail. The longitudinal rails are now attached in the corner regions of the modules, so that they can fix at least the modules arranged above the module to be replaced or serviced. Consequently, the longitudinal rails now assume the function of a holding device against which the frame can be placed on the front side of the frame, having a receptacle for a pulley on the upper frame segment, the receptacle being connectable to the transverse members which are likewise to be removed from the side walls, so that a type of pulley block is produced, whereby the module to be replaced can be lifted. In this way, it is also readily possible under difficult conditions, for example on the roof of a building, to perform a replacement or maintenance of a module. A fitter does not have to carry any additional mounting aids here, since all further installation aids are already present at the installation location apart from the two pulleys, which can easily be brought by the fitter to the installation location. As a result, a fitter can be sure on site, irrespective of the situation, that all installation aids required are already present. In this way, the installation device can be operated cost-effectively, as a result of which an identical initial situation is present independently of the installation location. It should be mentioned at this juncture that, in addition to the installation on a building roof, installation is also possible, for example, in a basement of a building, wherein the installation device can be extended accordingly depending on the application. Thus, in the first case, a rear wall or an upper cover would also be possible, while in the second case the side walls or the front covers can be designed to be aesthetically pleasing, as is often desired in private households. After the work to be carried out has been completed, the exchanged or the serviced module is re-inserted in the reverse order, wherein the longitudinal members are subsequently removed again and are inserted together with the transverse members into the frames, which then again complete the side walls of the installation device.

According to one embodiment of the invention, the upper frame segment can be provided with eyelets into which the pulley can be hooked.

Accordingly, it is possible in a simple manner to connect the frame to the pulley. In this case, the pulley can be hooked, for example, by means of a carabiner, even without tools.

According to a further embodiment of the invention, the longitudinal rails and the transverse rails of the frame correspond substantially to the outer dimensions of the frame.

Accordingly, the longitudinal rails are designed such that they can be mounted in the frame along the long side in the case of a typically rectangular embodiment of the side wall. The transverse members can be fastened in the frame transversely thereto along the short side of the side wall, wherein both the longitudinal member and the transverse member span the side wall substantially completely or almost completely. This results in great flexibility, since the longitudinal rails can be connected to the modules at any desired locations.

According to a further embodiment of the invention, a plurality of modules stacked one above the other are arranged next to one another.

In this way, a plurality of stacks of modules are now formed, which, arranged side by side, can substantially completely fill the interior of the installation device. For this purpose, the installation device can be offered, for example, with different widths and different heights, so that a different number of modules can be accommodated depending on the application. The inventive concept can therefore be easily transferred to various applications with different numbers of modules.

According to a further embodiment of the invention, the longitudinal rails are connected via holding devices to the modules remaining in the installation device.

In order to connect the longitudinal rails to the modules remaining in the installation device, a holding device, for example in the form of a holding plate or a holding angle, can be provided, which can be connected via connection holes or connecting slots by means of screws both to the longitudinal member and to the modules. However, it is also conceivable to provide corresponding profiles which can engage, without tools, in corresponding openings both in the holding rail and in the modules.

According to a further embodiment, the frame additionally comprises a removable side wall plate.

In this way, the side wall is protected against ambient influences, wherein, however, the side wall plate is not required for the installation work and therefore it can be removed.

The frame, the longitudinal rails and the transverse rail can be produced as metal profiles.

The modules can perform completely different tasks, wherein, in addition to the above-mentioned function of a heat pump, further tasks can be taken from power engineering or building services engineering. Thus, the modules can be provided, for example, as a hydraulic module, as a heat pump module, as a hot water module, as a ventilation module, as a battery module, as an inverter module, as a charging module, as an emergency power supply or as a module for energy management of a building and as a module for building automation. Typically, the modules are of the same footprint, so that a standardized procedure can take place.

The above-mentioned problem is also solved by a method for removing a module in an installation device described above.

Figure 2:
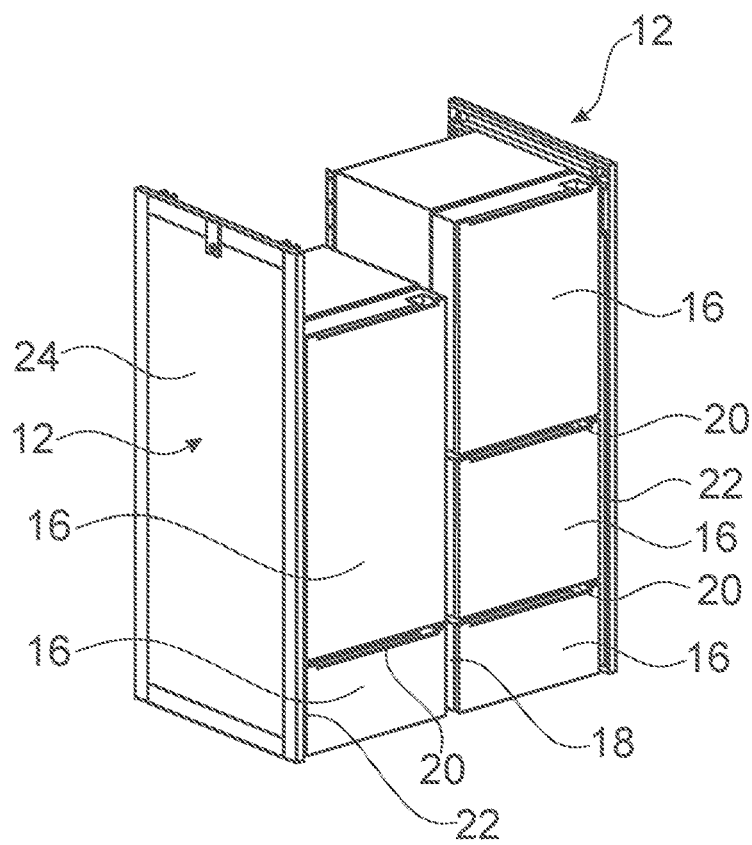
Figure 3:
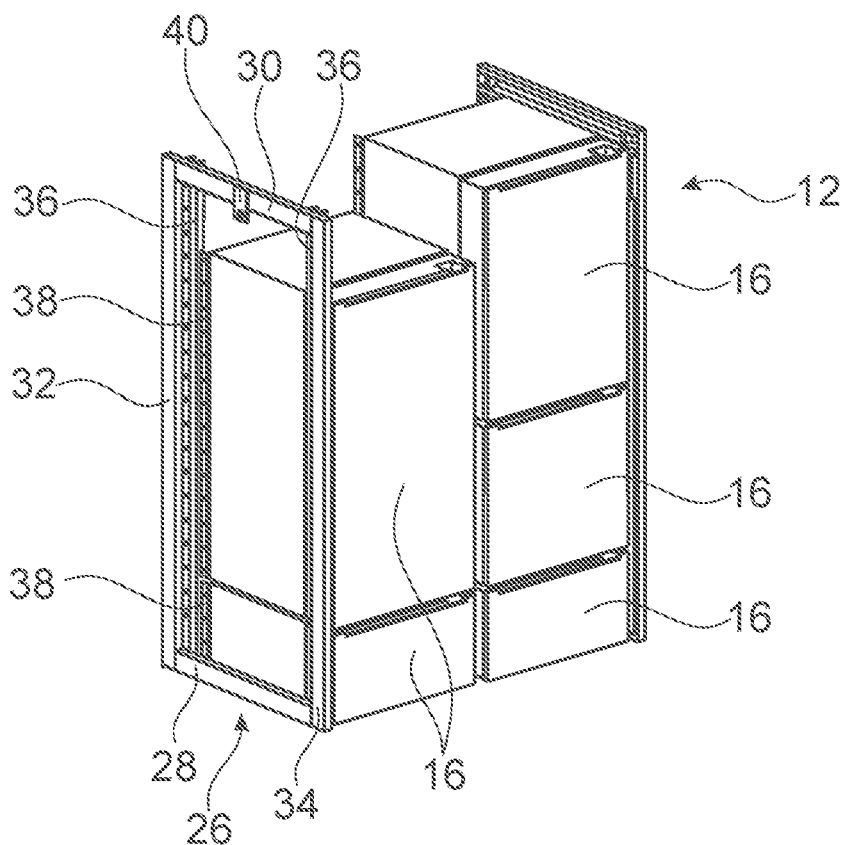
Figure 4:
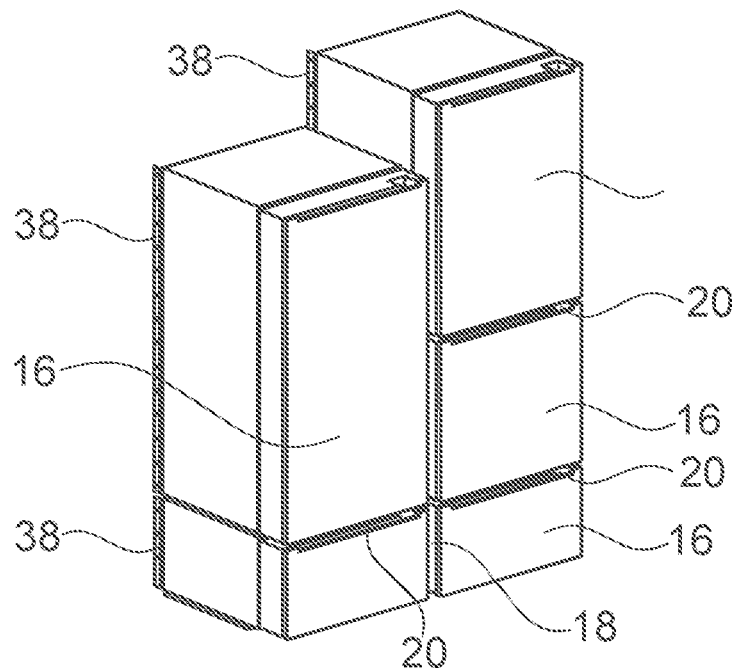
Figure 5:
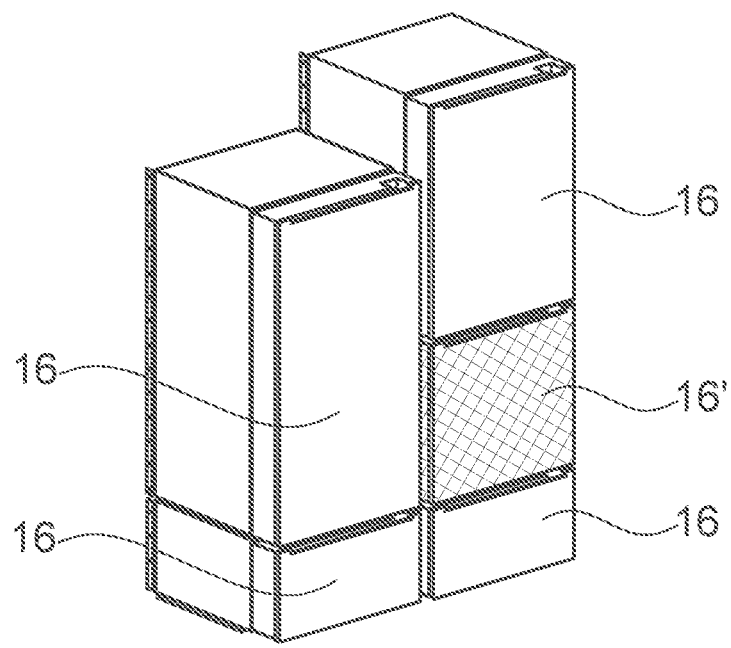
Figure 6:
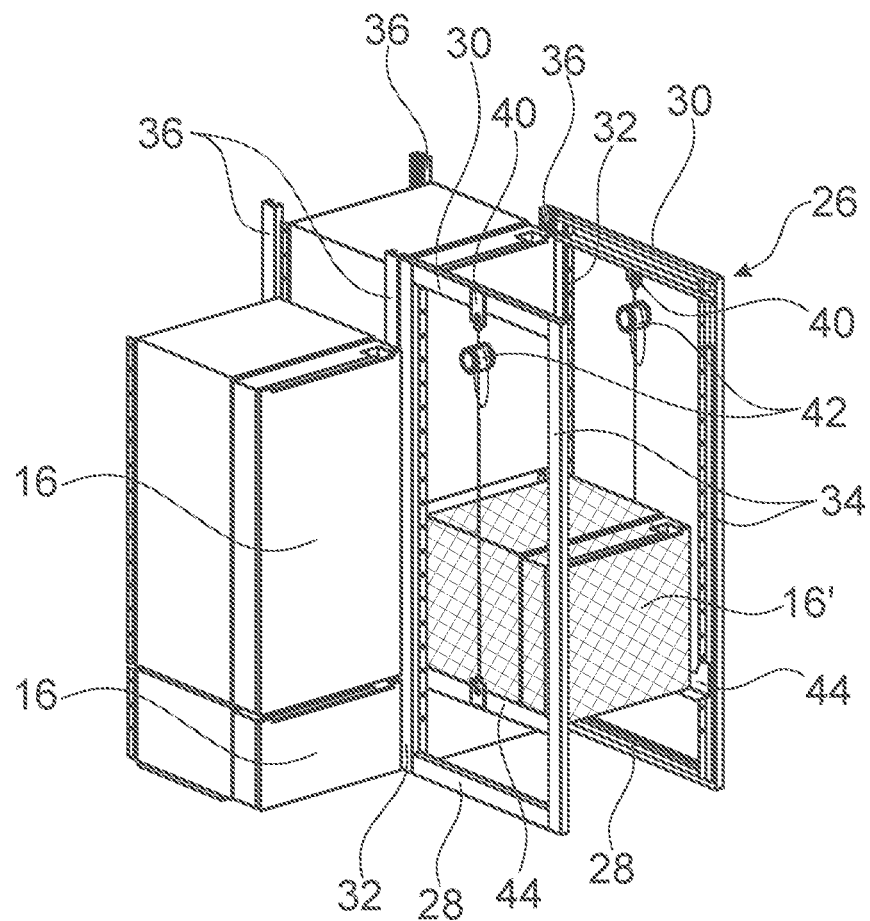
Figure 7:
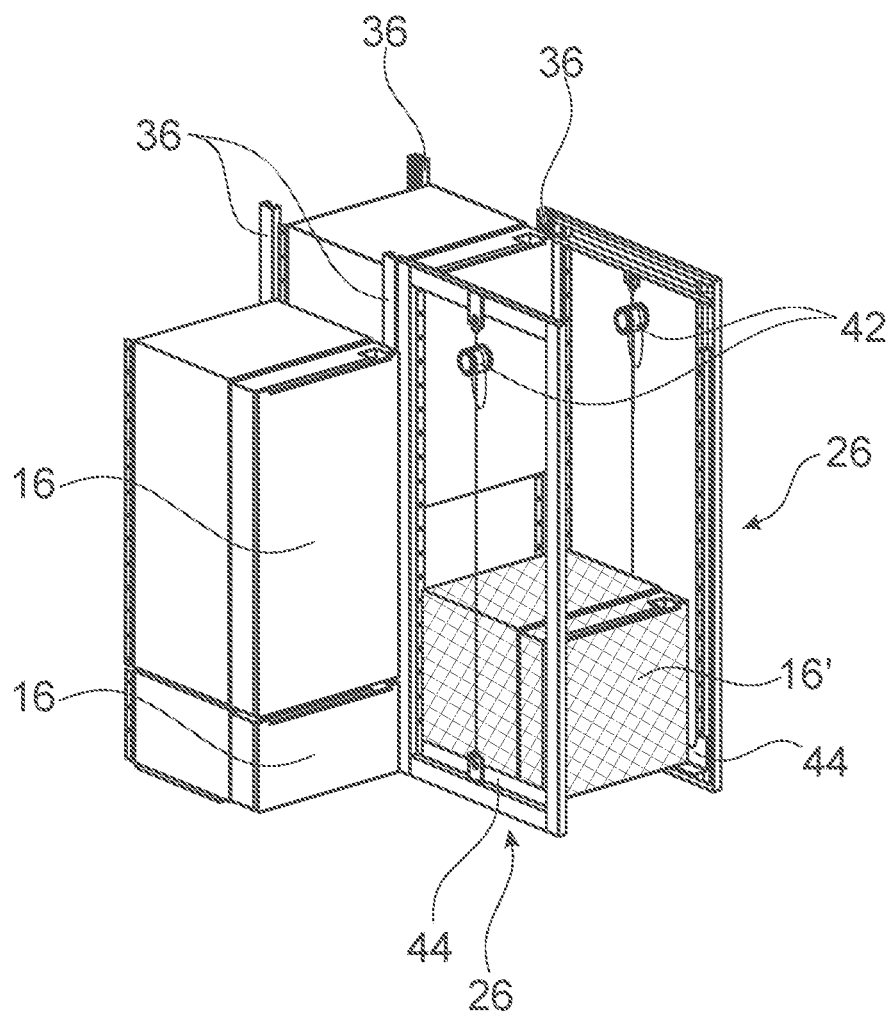

Some exemplary embodiments are explained in greater detail below with reference to the drawing. In the drawing:

FIG. 1 shows an installation device according to the invention in an assembled state before the start of installation work, FIG. 2 shows the installation device according to the invention with the front cover removed, FIG. 3 shows the installation device with removed side wall plates, FIG. 4 shows the modules stacked one above the other after removal of the frame, FIG. 5 shows the module arrangement with a marked module, FIG. 6 shows the module arrangement after attaching the longitudinal members, the frame, the transverse members and attaching the pulleys when removing a module, and FIG. 7 shows the module arrangement after the module to be serviced has been set down.

In the figures, like or functionally similarly acting components are provided with the same reference signs.

FIG. 1 shows a first embodiment of the installation device 10 according to the invention in a perspective side view. The installation device 10 comprises two side walls 12 and a removable front cover 14. Furthermore, the installation device 10 can also be provided with an upper cover which could lie above the modules 16 arranged in the interior of the installation device 10. A rear wall could also be connected to the module 16.

The interior of the installation device 10 is shown in FIG. 2 when the front cover 14 is removed. It can be seen that in the present example a total of five modules 16 with partially different dimensions are arranged inside the installation device 10. The modules 16 can take over different tasks here in the field of power engineering or building services engineering. Typically, the regions of the modules 16 which lie in the direction of the removable front cover 14 are designed with electronic open-loop or closed-loop control tasks, while fluid inlets or outlets can be located on the opposite side. The modules 16 all have the same footprint, so that they can be stacked one above the other, with a uniform edge being produced at the corners of the modules.

In addition, the modules are designed in the direction of the front cover 14 such that a vertical gap 18 can form between adjacent modules. Furthermore, a horizontal gap 20 can be seen between modules lying one above the other, said gap being produced, for example, in that the modules are equipped on their upper or lower side with projections or webs, which reduce the footprint of a module 16 compared to its outer dimensions. In addition to the vertical gap 18 and the horizontal gaps 20, a lateral gap 22 to the side walls 12 can also be seen. The side walls 12 additionally have removable side wall plates 24.

With reference to FIG. 3, the module arrangement is now shown with removed side wall plates 24. It can be seen that the side walls 12 are constructed from a frame 26 comprising a lower frame segment 28, an upper frame segment 30, a rear frame segment 32 and a front frame segment 34. Furthermore, a longitudinal rail 36 is attached to the rear frame segment 32 and is connected in vertically arranged perforated rails 38 at the rear corners of the modules 16, for example by means of holding devices in the form of strips or plates. A further longitudinal rail is arranged in the region of the front frame segment 34 and is also denoted by the reference sign 36 in FIG. 3. The frame 26 can now be separated from the modules 16, so that the modules 16 are stacked on one another alone and remain next to one another.

This state is shown in FIG. 4. The rear perforated rail 38 on the modules 16 and the horizontal and vertical gaps already mentioned above between adjacent modules can be seen.

FIG. 5 shows the module arrangement from FIG. 4 again, wherein a module 16' has now been characterized as a module that is to be removed.

The removal of the module will be described below with reference to FIG. 6. It can be seen that the four longitudinal members 36 are now arranged at the corners of the module stack at the stack of modules 16 which contains the module 16' to be removed, wherein the vertical gap 18 and the lateral gap 22 are selected with respect to their dimensions such that the longitudinal members 36 can be inserted. The frame 26 is attached to the front longitudinal members 36 by the rear frame segments 32, so that the two frames 26 are oriented parallel to one another and perpendicular to the front side of the module stack of the modules 16 and 16'. In the region of the upper frame segment 30 there is a receptacle 40, into which a pulley 42 is hooked. The receptacle 40 can be formed as an eyelet or the like; a connection to the pulley can be achieved via a carabiner.

The pulley 42 is connected to transverse members 44, which were also originally part of the side walls 12. The transverse members 44 are configured here such that they can be guided into the corner region between the horizontal gap 20 and the vertical gap 18 under the module 16' to be replaced, so that the module 16' to be replaced can be removed by actuating the pulley 42. For this purpose, the module 16 lying above the module 16' to be replaced must be connected to the longitudinal members 36 at the perforated rail 38, so that the region of the module 16' to be replaced can remain free. After pulling out the module 16' in the horizontal direction on the transverse members 44 and, as appropriate, removing lines and the like, the module 16' is then free and can, as shown in FIG. 7, be set down on the floor by actuating the pulley 42 and, for example, can be serviced or replaced or subjected to further work. Depending on the weight of the module lying above, it may also be necessary to raise this module slightly by means of the pulley 42 before the module 16' to be replaced is removed, and then to secure it to the longitudinal members 36, so that the module 16' to be replaced can be removed more easily.

Once the module 16' is ready for use again, the steps are carried out in the reverse order, so that the module is lifted up again by means of the pulley 42 after having been set down on the floor in front of the installation stack and can subsequently be inserted into its position in the module stack in the horizontal direction. The frame 26 and the longitudinal members 36 are subsequently removed again together with the transverse members 44, and the side walls are attached at their original position after insertion of the removable side wall plate 24 together with the removable front cover 14, so that the state according to FIG. 1 can be produced again.

In this way, it is possible to remove power-engineering or building-services-engineering modules from a module stack, wherein a fitter has to carry only the pulley 42 in addition to their personal tool, since all the remaining installation aids are already part of the side walls 12. This represents a substantial simplification in the servicing or repair of the installation device 10.

The features described above and the features shown in the claims and those which can be deduced from the figures can be advantageously realized both individually and in various combinations. The invention is not limited to the described exemplary embodiments, but can be modified in many ways within the scope of the capabilities of a person skilled in the art.

LIST OF REFERENCE SIGNS installation device 10
side walls 12
front cover 14
module 16
module to be replaced 16'
vertical gap 18
horizontal gap 20
lateral gap 22
side wall plate 24
frame 26
lower frame segment 28
upper frame segment 30
rear frame segment 32
front frame segment 34
longitudinal rail 36
perforated rail 38
receptacle 40
pulleys 42
transverse rail 44

The invention claimed is:

1. An installation device comprising power-engineering or building-services-engineering modules (16), which comprises at least two side walls (12) and a removable front cover (14) which enclose a plurality of stackable modules (16), wherein the side walls (12) have a frame (26), two longitudinal rails (36) arranged therein, and a transverse rail (44), wherein the longitudinal rails (36) are arranged along the corners of the modules (16) remaining in the device for servicing of a module (16'), in order to secure the one or more modules (16) arranged above the module (16') to be serviced, wherein the two frames (26) are arranged along two longitudinal rails (36) on the front side and can be connected, via pulleys (42) attached to the upper frame segment (30), to the transverse rails (44), on which the module (16') to be serviced rests, so that said module is removable from the installation device (10) once the one or more modules (16) arranged above the module (16') to be serviced is/are secured to the longitudinal rails (36).

2. The installation device according to claim 1, with which the upper frame segment (30) is provided with eyelets (40) into which the pulley (42) can be hooked.

3. The installation device according to claim 1, with which the longitudinal rails (36) and the transverse rail (44) of the frame (26) correspond substantially to the outer dimensions of the frame (26).

4. The installation device according to claim 1, with which a plurality of modules (16) stacked one above the other are arranged next to one another.

5. The installation device according to claim 1, with which the longitudinal rails (36) are connected via holding devices to the modules (16) remaining in the installation device (10).

6. The installation device according to claim 1, with which the frame (26) additionally comprises a removable side wall panel (24).

7. The installation device according to claim 1, with which the frame (26), the longitudinal rails (36) and the transverse rail (44) are produced as metal profiles.

8. The installation device according to claim 1, with which the modules (16) are provided as a hydraulic module, as a heat pump module, as a hot water module, as a ventilation module, as a battery module, as an inverter module, as a charging module, as an emergency power supply or as a module for energy management of a building as well as a module for building automation.

9. The installation device according to claim 1, with which the modules (16) have the same footprints.

10. A method for removing a module in the installation device according to claim 1, with which the following steps are performed:
   removing the side walls (12) and the front cover (14),
   removing the frame (26), the longitudinal members (36) and the transverse members (44) from the side walls (12),
   attaching the longitudinal members (36) to the corners of the modules (16),
   connecting one or more modules (16) remaining in the installation device (10) to the longitudinal members (36),
   arranging the frames (26) in parallel along the longitudinal members (36) on the front side of the installation device (10),
   hooking pulleys (42) on the upper frame segments (30),
   connecting a pulley (42) to each transverse member (44),
   attaching the transverse members (44) to the underside of the module (16') to be replaced,
   removing the module (16') to be removed in the horizontal direction while actuating the pulleys (42), wherein the module (16') to be removed rests on the transverse members (44), and
   setting down the module (16') to be removed in the vertical direction by actuating the pulleys (42) again.

* * * * *